(12) United States Patent
Barimani et al.

(10) Patent No.: US 10,822,041 B2
(45) Date of Patent: Nov. 3, 2020

(54) EARTH WORKING MACHINE HAVING A PANEL ARRANGEMENT LIFTABLE AND LOWERABLE TOGETHER WITH A PROTECTIVE CANOPY

(71) Applicant: Wirtgen GmbH, Windhagen (DE)

(72) Inventors: Cyrus Barimani, Königswinter (DE); Stephan Drumm, Ockenfels (DE); Alexander Körtgen, Bonn (DE)

(73) Assignee: Wirtgen GmbH (DE)

( * ) Notice: Subject to any disclaimer, the term of this patent is extended or adjusted under 35 U.S.C. 154(b) by 15 days.

(21) Appl. No.: 16/190,721

(22) Filed: Nov. 14, 2018

(65) Prior Publication Data

US 2019/0161131 A1 May 30, 2019

(30) Foreign Application Priority Data

Nov. 24, 2017 (DE) .......................... 10 2017 221 053

(51) Int. Cl.
*B60J 7/04* (2006.01)
*B62D 33/063* (2006.01)
(Continued)

(52) U.S. Cl.
CPC .......... *B62D 33/0636* (2013.01); *B60J 7/042* (2013.01); *B60J 7/1692* (2013.01); *B60J 7/201* (2013.01);
(Continued)

(58) Field of Classification Search
CPC .. B62D 33/063; B62D 33/0636; B62D 33/06; B62D 33/0621; B60J 7/042; B60J 7/1692
See application file for complete search history.

(56) References Cited

U.S. PATENT DOCUMENTS 4,022,026 A * 5/1977 Childress ................ E21D 19/00
405/293
4,079,792 A * 3/1978 Paul ........................ E21D 19/02
173/189
(Continued)

FOREIGN PATENT DOCUMENTS

DE    202012005043 U1    9/2012
DE    202011050733 U1    12/2012
(Continued)

OTHER PUBLICATIONS

Stefan Kuhn, Self-propelled machine, in particular construction machine, a self-propelled machine and method for adjusting a driver's cab with adjustable cab, Oct. 12, 2017, EPO, DE 10 2016 010 660 A1, Machine Translation of Description (Year: 2017).*
(Continued)

*Primary Examiner* — James A English
(74) *Attorney, Agent, or Firm* — Lucian Wayne Beavers; Patterson Intellectual Property Law, PC

(57) ABSTRACT

An earth working machine (10), for example a road milling machine (10), recycler, stabilizer, or surface miner, having a propelling unit (22) and a machine frame (12); the earth working machine (10) comprising a working apparatus (32) for earth working; and an operator's platform (24), having an operator's platform floor (64) and having at least one operating device (26), being provided on the machine frame (12); the earth working machine (10) comprising a protective canopy (44) liftable and lowerable relative to the operator's platform floor (64) between a lifted operating position and a lowered transport position; the earth working machine (10) comprising a panel arrangement (46) having an upper edge (46a) located closer to the protective canopy (44), having a lower edge (46b) located farther from the protective canopy (44) at a distance from the upper edge (46a), and having two side edges (46c, 46d) spanning the
(Continued)

distance between the upper And the lower edge (46a, 46b); the panel arrangement (46) being connected in an upper connecting region (58), located closer to its upper edge (46a) than to its lower edge (46b), to the protective canopy (44) and being connected in a lower connecting region (60), located closer to its lower edge (46b) than to its upper edge (46a), to the machine frame (12) and/or to the operator's platform floor (64) constituting a connecting base. Provision is made according to the present invention that the panel arrangement (46) is liftable and lowerable together with the protective canopy (44), the panel arrangement (46) being received on the earth working machine (10) with its lower edge (46b) movably toward and away from the operator's platform floor (64).

21 Claims, 7 Drawing Sheets

(51) Int. Cl.
 B60J 7/20 (2006.01)
 B62D 33/06 (2006.01)
 E01C 23/088 (2006.01)
 B60J 7/16 (2006.01)
 E02F 9/16 (2006.01)

(52) U.S. Cl.
 CPC ..... B62D 33/0617 (2013.01); B62D 33/0621 (2013.01); E01C 23/088 (2013.01); E02F 9/166 (2013.01); E01C 2301/30 (2013.01)

(56) References Cited

U.S. PATENT DOCUMENTS

| | | | | |
|---|---|---|---|---|
| 5,765,316 | A * | 6/1998 | Kavarsky | E04B 1/3442 52/143 |
| 5,893,677 | A * | 4/1999 | Haehn | E01C 23/088 404/90 |
| 6,059,351 | A * | 5/2000 | Ehnes | B62D 33/0621 135/88.01 |
| 7,246,835 | B1 * | 7/2007 | Colburn | B60P 3/42 280/775 |
| 8,371,641 | B2 | 2/2013 | Bohme et al. | |
| 8,978,311 | B1 * | 3/2015 | Uhl | B60P 3/0252 52/36.1 |
| 2007/0252411 | A1 * | 11/2007 | Heusinger | B62D 33/0636 296/190.03 |
| 2014/0035344 | A1 | 2/2014 | Huhn | |
| 2015/0102637 | A1 * | 4/2015 | Lemke | B62D 33/0621 296/190.08 |
| 2015/0367897 | A1 | 12/2015 | Gillard et al. | |
| 2018/0354341 | A1 | 12/2018 | Mer et al. | |

FOREIGN PATENT DOCUMENTS

| | | | |
|---|---|---|---|
| DE | 202013006878 U1 | 8/2013 | |
| DE | 102016010660 A1 * | 10/2017 | ........... E01C 23/088 |
| DE | 102016010660 A1 | 10/2017 | |
| EP | 810324 A1 | 12/1997 | |
| EP | 2135800 A1 | 12/2009 | |
| EP | 2166154 A2 | 3/2010 | |
| EP | 2723629 A1 | 4/2014 | |
| EP | 3412830 A1 | 12/2018 | |
| JP | 5431607 U | 3/1979 | |
| WO | 9624725 A1 | 8/1996 | |

OTHER PUBLICATIONS

European Patent Office Search Report dated Jan. 18, 2019 for corresponding European Patent Application No. EP 18 20 6168 (not prior art).

Wirtgen W200 brochure (56 pages)(Jan. 2016) (Uploaded to EFS Web in 3 different parts).

Third Party Observation filed in corresponding EPO Application Serial No. 18206168.9, along with English machine translation (not prior art).

* cited by examiner

EARTH WORKING MACHINE HAVING A PANEL ARRANGEMENT LIFTABLE AND LOWERABLE TOGETHER WITH A PROTECTIVE CANOPY

BACKGROUND OF THE INVENTION

The present invention relates to an earth working machine, for example a road milling machine, recycler, stabilizer, or surface miner, having a propelling unit and a machine frame carried by the propelling unit; the earth working machine comprising a working apparatus for earth working; and an operator's platform, having an operator's platform floor and having at least one operating device for controlling at least one functional device of the earth working machine, being provided on the machine frame; the earth working machine comprising a protective canopy liftable and lowerable relative to the operator's platform floor between a lifted operating position and a lowered transport position; the earth working machine comprising a panel arrangement, encompassing a panel, having an upper edge located closer to the protective canopy, having a lower edge located farther from the protective canopy at a distance from the upper edge, and having two side edges spanning the distance between the upper and the lower edge; the panel arrangement being connected in an upper connecting region, located closer to its upper edge than to its lower edge, to the protective canopy and being connected in a lower connecting region, located closer to its lower edge than to its upper edge, to a machine frame-mounted and/or operator's platform floor-mounted connecting base.

An earth working machine of this kind, in the form of a large road milling machine of the Applicant, is known under the designation "W 200". In this earth working machine, the protective canopy is connected to the machine frame, via a front and a rear connecting frame, in such a way that the protective canopy constitutes a parallelogram four-joint linkage with the connecting frame. Both the front and the rear connecting frame are respectively connected articulatedly to the machine frame around a machine frame pivot axis extending in a transverse machine direction (parallel to the yaw axis), and connected to the protective canopy articulatedly around a protective canopy pivot axis parallel thereto. So that both the connecting frames and the protective canopy rest on or abut against the machine frame in maximally flat fashion in the transport position, the machine frame pivot axis and the protective canopy pivot axis are at the same distance from one another for each of the substantially planar connecting frames. The vertical extent of the working machine parallel to the yaw axis can thereby be greatly decreased, which is advantageous in terms of complying with maximum external transport dimensions when transporting the machine.

During a displacement between the transport position and operating position, the protective canopy of the W 200 executes a translational motion, guided by the two connecting frames, which proceeds approximately along a quarter-circle motion trajectory. In the existing art the protective canopy therefore not only is lowered to the operator's platform floor or lifted from it, but is simultaneously moved in the longitudinal machine direction (parallel to the roll axis) as it approaches or is lifted from the operator's platform floor.

Because the connecting frames of the W 200 each carry a panel arrangement, the change in the distance of the protective canopy from the operator's platform floor is accompanied by a change in the distance of the panel arrangement from the operator's platform floor. Because the panel arrangement of the known W 200 is pivoted, together with the connecting frame carrying it, around the aforementioned machine frame pivot axis that is parallel to the yaw axis, what changes along with the distance of the protective canopy from the operator's platform floor is substantially only the distance between the operator's platform floor and that region of the panel arrangement which is located between the machine frame pivot axis and the protective canopy. That region of the panel arrangement which is located directly on the machine frame pivot axis changes its distance relative to the operator's platform floor not at all or only to a negligible extent, or in fact changes it in a change direction opposite from that of the protective canopy. This does not, however, affect the fact that during the displacement of the protective canopy of the known W 200 between the operating position and transport position, the center point of a panel arrangement carried by a connecting frame respectively moves away from and toward the operator's platform floor.

When the protective canopy is in the transport position, the vertical dimension of the earth working machine is or can be decreased by lowering the machine frame toward the supporting substrate by means of the propelling unit, in such a way that maximum external transport dimensions to be complied with for transport can in fact be complied with. In Germany, for example, a loaded transport semi-trailer must not exceed an overall height of 4.00 m without special authorization.

Vandalism is becoming an increasingly frequent problem with earth working machines during times of unmonitored non-use, as unauthorized persons enter construction sites and tamper with machinery parked there. Some persons also attempt to gain access to the operator's platform of an earth working machine. These persons are as a rule motivated not by technical curiosity but by destructiveness, so that there is a great deal of interest in making the operator's platform difficult to access for unauthorized persons, and also in protecting easily damaged assemblies, for example transparent panels, as effectively as possible from attack by vandals.

In principle, access to the operator's platform can be made more difficult by lowering the protective canopy from the operating position into the transport position. Because of the aforementioned kinematics of the protective canopy, a panel arrangement of the operator's platform is exposed—and thus susceptible to vandalism—when the protective canopy of the known W 200 is in the transport position.

SUMMARY OF THE INVENTION

The object of the present invention is therefore to refine the earth working machine recited previously in such a way that essential parts of its operator's platform, for example the aforementioned panel arrangement, can be better protected against vandalism than is the case with machines of the existing art.

According to the present invention this object is achieved by an earth working machine of the kind recited previously in which the panel arrangement is liftable and lowerable together with the protective canopy, the panel arrangement being received on the earth working machine with its lower edge movably toward and away from the operator's platform floor.

Unlike the panel arrangement, referred to above, of the known W 200, the panel arrangement of the earth working machine according to the present invention does not move exclusively rotationally, namely pivot around the above-described machine pivot axis, during a displacement of the protective canopy between the operating position and the transport position. The panel arrangement is also moved at least translationally. When the protective canopy is in the transport position, each point on the panel arrangement is therefore located closer to the operator's platform floor than when the protective canopy is in the operating position. The panel arrangement can also be moved exclusively translationally upon displacement of the protective canopy between the operating position and transport position.

It is not to be excluded that the translational motion of the panel arrangement is overlaid by a rotational motion, for example in order to avoid flexural or torsional mechanical stresses in the panel arrangement. As a result of the translational motion of the panel arrangement toward the operator's platform floor, however, the panel arrangement can be partly or in fact completely concealed when the protective canopy is in the transport position. The panel arrangement can thus be externally inaccessible and thus not attacked, or attacked only with considerably greater effort, when the protective canopy is in the transport position.

The panel arrangement can encompass or be a transparent panel, for example made of glass or of a transparent plastic such as polymethyl methacrylate (PMMA). Transparent plastic as a rule has a lower density than glass and is less susceptible to breakage, although glass as a rule is more scratch-resistant. The panel arrangement can also, however, be embodied in opaque fashion as a panel-shaped wall, for example if it is arranged in a region outside a working field of view of the machine operator.

The panel arrangement can comprise a frame enclosing the panel, which can mitigate any flexural and/or twisting loads that may act on the transparent panel, since forces, or deformations leading to forces, that occur between the protective canopy and the machine frame can be absorbed by the panel frame and do not need to be absorbed, or at least not completely absorbed, by the panel. The term "panel" is to be understood here as an indication of shape, and refers to a planar component that extends substantially in a panel surface, preferably a panel plane, and whose thickness direction extends orthogonally to the panel surface. The dimensions of the panel along the panel surface are several times greater than its thickness measurement.

In particular, the aforementioned side edges of the panel arrangement can be constituted by the panel itself, which advantageously enlarges the field of view through the panel. As a rule, however, a connecting apparatus will be necessary in order to connect the panel arrangement on the one hand to the protective canopy in the upper connecting region and on the other hand to the connecting base in the lower connecting region. A connecting apparatus of this kind can be embodied on a panel frame or connected thereto.

The lower connecting region of the panel arrangement can be connected to a machine frame-mounted mounting component, i.e. one connected for motion substantially together with the machine frame, or can be connected to an operator's platform floor-mounted mounting component, i.e. one connected for motion together with the operator's platform floor. This distinction is unnecessary when the operator's platform floor is itself machine frame-mounted, since then any component connected for motion together with the operator's platform floor is also connected for motion together with the machine frame. When the operator's platform as a whole, and with it the operator's platform floor, are arranged displaceably relative to the machine frame, however, the panel arrangement is preferably connected in its lower connecting region to a mounting component connected for motion together with the operator's platform floor, so that the panel arrangement, protective canopy, and operator's platform floor can together be part of the operator's platform and can be displaced together with the operator's platform relative to the machine frame. So that both cases can be encompassed in the present Application, what is being discussed here is the connecting base, which can be machine frame-mounted and/or operator's platform floor-mounted depending on the configuration of the earth working machine. But because operator's platform floors arranged displaceably relative to the machine frame are the exception, the machine frame is preferably the connecting base. Operator's platform floors that are connected in merely passively micromovable fashion to the machine frame with interposition of a vibration damping element are "machine frame-mounted" operator's platform floors for purposes of the present Application.

In both the operating position and the transport position of the protective canopy, and in at least one intermediate position during a displacement of the protective canopy between the operating position and transport position, the panel arrangement is connected both to the protective canopy and to the connecting base. The panel arrangement is preferably connected to the protective canopy and to the connecting base permanently, i.e. independently of the vertical position assumed by the protective canopy relative to the operator's platform floor.

It should be possible to ensure a maximally defined motion of the panel arrangement during a displacement of the protective canopy between the operating position and the transport position. This applies in particular to the motion of the lower connecting region. According to a preferred refinement, the panel arrangement is therefore connected in its lower connecting region to the connecting base via a linear guidance system that guides the relative motion of the lower connecting region away from and toward the connecting base as the protective canopy is respectively lifted and lowered.

A guidance part of the linear guidance system, preferably a guidance rail, is fixedly connected to the connecting base. This guidance part constitutes the aforementioned machine frame-mounted or operator's platform floor-mounted mounting component. A further guidance part of the linear guidance system, preferably a guidance carriage or guidance slide or slide block or the like, guided movably on the first guidance part, is connected to the lower connecting region of the panel arrangement. The two guidance parts are coupled movably relative to one another along a guidance path predefined by the linear guidance system. Merely for the sake of completeness, be it noted that kinematically conversely from the above-described preferred embodiment, the panel arrangement can also be fixedly connected to a guidance rail. The guidance carriage or guidance slide or slide block or the like is then, depending on the configuration of the machine, machine frame-mounted and/or operator's platform floor-mounted.

The linear guidance system does not necessarily need to guide the lower connecting region of the panel arrangement along a straight guidance path. The guidance path can also comprise one or several curved path regions. The curvature of the guidance path, if it is present at all, will nevertheless preferably turn out to be considerably less than in the case of the quarter-circle guidance path known from the existing art. According to a preferred embodiment, however, the guidance path is straight so that the simplest possible motion conditions at the protective canopy and at the panel arrangement can be achieved.

In contrast to the known W 200, the area of the operator's platform floor coverable by the protective canopy is no smaller in the transport position than in the operating position. For clarity, the coverage is to be ascertained by projecting the protective canopy and the operator's platform floor along the yaw axis of the machine onto a projection plane orthogonal to the yaw axis.

In order to simplify the lifting and lowering motion of the protective canopy, that motion preferably occurs along a straight motion path. In order to ensure sufficient coverage of the operator's platform, that path is preferably parallel to the yaw axis or is tilted with respect thereto by no more than 10°, preferably by no more than 7.5°. When the motion path is tilted relative to the yaw axis, it is preferably tilted around a tilt axis parallel to the pitch axis, particularly preferably in a forward direction, so that the protective canopy is located closer to the front end of the earth working machine in the operating position than in the transport position. For maximally simple and unstressed motion of the protective canopy together with the panel arrangement between the operating position and the transport position, the motion paths of the lower connecting region of the panel arrangement on the one hand and of the protective canopy on the other hand are preferably parallel, or at least are tilted by no more than 5° relative to one another around an inclination axis parallel to the pitch axis.

Alternatively, the path of the protective canopy upon displacement thereof can be slightly curved at least in portions. Regardless of whether the motion path of the protective canopy is curved or tilted, it is preferred that that component of the motion path which extends along the roll axis be equal to no more than 25%, preferably no more than 20%, particularly preferably no more than 12% of the component that extends along the yaw axis. It is thereby possible to ensure that the protective canopy covers a majority, i.e. more than half, of the operator's platform floor in both the transport position and the operating position.

In principle, consideration can be given to connecting the upper connecting region of the panel arrangement rigidly to the protective canopy and/or connecting the lower connecting region of the panel arrangement rigidly to that part of the linear guidance system which is associated with it. Forces that can elastically deform the machine body act on the machine frame during travel mode and/or earth working mode, and this in turn can impose stress on the panel arrangement. According to a refinement of the invention, undesired stress of this kind can be decreased by the fact that the upper connecting region of the panel arrangement is connected to the protective canopy rotatably relative to the protective canopy around a side motion axis that is orthogonal to the motion path of the lifting and lowering motion of the protective canopy, and is preferably parallel to the pitch axis. Flexural moments thus cannot be transferred around the side motion axis between the protective canopy and the panel arrangement.

Additionally or alternatively, the lower connecting region of the panel arrangement can be connected to the connecting base rotatably relative to the connecting base around a lateral motion axis parallel to the side motion axis. The result of this is that flexural torques acting around the lateral motion axis are not transferrable between the connecting base and the panel arrangement. For clarification, be it noted that when the lower connecting region is connected to the connecting base rotatably relative thereto around the lateral motion axis, the trajectory of the lateral motion axis indicates the motion path of the lower connecting region.

In addition or alternatively to the respective connection of the panel arrangement to the protective canopy or to the connecting base rotatably around the side motion axis and/or around the lateral motion axis, provision can furthermore be made that the upper connecting region is connected to the protective canopy translationally shiftably along the side motion axis relative to the protective canopy, and/or that the lower connecting region is connected to the connecting base translationally shiftably along the lateral motion axis relative to the connecting base. It is thereby possible to suppress force transfer not only between the protective canopy and panel arrangement, but also between the connecting base and panel arrangement parallel respectively to the side motion axis or lateral motion axis. A connection having a translational degree of freedom of motion between the upper connecting region of the panel arrangement and the protective canopy allows the machine operator to displace the protective canopy relative to the panel arrangement along the side motion axis. A connection of the lower connecting region to the connecting base also having a translational degree of freedom of motion allows the machine operator to displace the panel arrangement relative to the connecting base and relative to the protective canopy.

Preferably the upper and the lower connecting region are movably connected respectively to the protective canopy and to the connecting base both translationally along and rotationally around the side motion axis and the lateral motion axis. This can be implemented physically in simple fashion by using a pairing of a linear rolling element bearing, in particular a linear ball bearing, and a guidance rod to connect the panel arrangement to the protective canopy and to the connecting base. The linear rolling element bearing is not only translationally displaceable along the guidance rod, but also rotatable around the guidance rod. The combination of guidance rod and linear rolling element bearing can be part of the aforementioned connecting apparatus that connects the panel arrangement respectively to the protective canopy and to the connecting base. The one component from among the guidance rod and linear rolling element bearing is connected to the panel arrangement, and the respective other component to the protective canopy or the connecting base.

The panel arrangement can be retainable, relative to the connecting base and/or to the protective canopy, in its position along the displacement travel defined by the guidance rod. Actively actuatable retaining means, for example at least one frictionally engaging clamp or at least one positively engaging latching means, can be provided for this purpose, or passive retaining means can be provided, for example at least one overridable snap lock.

In order to avoid damage due to collision between the panel arrangement and further components of the earth working machine, the earth working machine can comprise a sensor arrangement having at least one sensor, for example a proximity sensor and/or a tactile sensor. The sensor arrangement detects whether the panel arrangement is in a predetermined permitted position region proceeding from which there is no risk of collision associated with a motion of the panel arrangement relative to the operator's platform floor. A motion controller of the protective canopy can be embodied in such a way that a displacement from the operating position into the transport position is permitted only when a detection signal transferred from the sensor arrangement to a control device controlling the protective canopy motion indicates that the panel arrangement is located in the predetermined permitted position region.

For optimum protection of the panel arrangement against external access when the protective canopy is in the lowered transport position, the earth working machine can comprise a connecting base-mounted shield that delimits, at least toward the operator's platform, a receiving space in which the panel arrangement is located when the protective canopy is lowered into the transport position. Either the machine body or a side partition of the operator's platform is located as an access obstacle in the opposite direction, i.e. away from the operator's platform. If a vandal nevertheless gains access to the operator's platform, the shielding of the receiving space toward the operator's platform is particularly useful.

The shield can be constituted by at least one subassembly present in any case in the operator's platform, for example by an equipment cabinet or a operating console. These subassemblies can be of robust configuration and can withstand a vandalism attack for a long time. A separate shielding plate, made e.g. of metal and/or (preferably filled) plastic, can nevertheless be provided as a shield.

Because the panel arrangement as a rule is a planar, in particular flat, panel arrangement that extends in two spatial directions that are locally orthogonal not only to one another but also to the thickness direction of the panel arrangement, the shield delimits the receiving space preferably oppositely at least to the principal area of extent of the panel arrangement. The shield preferably covers the entire panel area and particularly preferably extends beyond the panel, in particular beyond the entire panel arrangement, on all sides of the principal area of extent of the panel arrangement.

The shield can shield the receiving space both toward the operator's platform and away from the operator's platform, so that in the lowered position the panel arrangement can also be protected on the machine body side, for example with respect to parts that move in the machine body or condensing vapors and the like.

For optimum protection of the panel arrangement in the lowered position, the shield can be embodied to continuously surround the motion path.

The panel arrangement is preferably a front window arrangement or windshield arrangement that is located at that end region of the operator's platform which is toward the front in the forward travel direction of the earth working machine. That need not be the case, however. The panel arrangement can also be a rear wall having a preferably transparent rear panel. Less preferably, the panel arrangement can also be a side wall that once again preferably, but not obligatorily, has a transparent panel.

The panel arrangement preferably extends in a transverse machine direction, i.e. parallel to the pitch axis. Although the aforementioned panel arrangement can be the only panel arrangement of the operator's platform, a further similar or identical arrangement can be provided on the earth working machine in addition to the panel arrangement and at a distance therefrom. Merely for better differentiation from the aforementioned panel arrangement, this further arrangement is referred to hereinafter as a "partition arrangement." According to a preferred refinement of the present invention the earth working machine can accordingly comprise, at a distance from the panel arrangement, a partition arrangement having a planar partition. The partition arrangement can comprise an upper edge located closer to the protective canopy, a lower edge located farther from the protective canopy at a distance from the upper edge, and can comprise two side edges spanning the distance between the upper and the lower edge. The partition arrangement can be connected to the protective canopy in an upper connecting region located closer to its upper edge than to its lower edge, and to the machine frame and/or to the operator's platform floor, constituting a connecting base, in a lower connecting region located closer to its lower edge than to its upper edge. The partition arrangement is liftable and lowerable together with the protective canopy, and for that purpose is received on the earth working machine with its lower edge movably toward and away from the operator's platform floor.

The partition arrangement can comprise a transparent partition or an opaque partition. It is preferably a rear partition or, in the context of a transparent rear partition, a rear window, which is located at that end region of the operator's platform which is at the rear in the forward travel direction. Like the panel arrangement, it preferably extends along the pitch axis of the earth working machine. The panel arrangement and the partition arrangement can extend parallel to one another in their lifted position when the protective canopy is in the operating position, but can also enclose an angle around an axis parallel to the pitch axis. At least the upper edge of the panel arrangement and the upper edge of the partition arrangement, however, preferably extend parallel to one another and particularly preferably parallel to the pitch axis, i.e. in a transverse machine direction. Preferably both the panel arrangement and the partition arrangement, in their lifted position, are arranged parallel to the motion path of the protective canopy between the operating position and the transport position, so that the arrangements can be lowered with the least possible motion space requirement. Also preferably, the panel arrangement and the partition arrangement are also parallel to one another in their lowered position, i.e. when the protective canopy is in its transport position. If parallelism between the panel arrangement and partition arrangement is not necessary or desired, what can be achieved by way of the above-described configuration is that the panel arrangement and partition arrangement have the same relative arrangement with respect to one another, e.g. are tilted at the same angle to one another, in their lifted position and their lowered position.

The statements made above regarding the panel arrangement and the panel apply in the same manner, mutatis mutandis, to the partition arrangement and its partition, the "panel" of the panel arrangement being replaced by the "partition" of the partition arrangement. To the extent that both the panel arrangement and the partition arrangement are respectively connected, movably around and/or along side motion axes or lateral motion axes, to the protective canopy and to a guidance part of a linear guidance system, the side motion axes and lateral motion axes of the panel arrangement and partition arrangement are preferably parallel to one another.

The protective canopy can comprise a shell carrier that is connected to a lifting guidance part for lifting and lowering motion together. The lifting guidance part interacts with a connecting base-mounted counterpart lifting guidance part in order to guide the lifting and lowering motion of the protective canopy. The two parts (lifting guidance part and counterpart lifting guidance part) together constitute a motion guidance system of the protective canopy for the lifting and lowering motion. Preferably the lifting guidance part and counterpart lifting guidance part constitute a space-saving telescoping motion guidance system. One part from among the lifting guidance part and counterpart lifting guidance part, preferably the lifting guidance part, is then retractable into and extendable out of the respective other part, preferably the counterpart lifting guidance part.

The straight guidance path, recited above as preferred, of the protective canopy upon displacement thereof between the operating position and transport position can be implemented with little installation space requirement using this motion guidance system.

In principle, consideration can be given to arranging the shell carrier on the lifting guidance part movably relative thereto, for example in a direction orthogonal to the lifting and lowering motion path. The protective canopy as a whole can thereby be displaced parallel to the operator's platform floor. In the interest of maximum stability of the protective canopy design, however, the shell carrier is preferably connected rigidly to the lifting guidance part.

In order to modify, in particular to increase, that area of the operator's platform floor which can be covered with the protective canopy, at least one canopy shell can be received on the shell carrier movably relative to the shell carrier. The at least one canopy shell is movable relative to the shell carrier translationally along a pull-out path that encloses an angle with the motion path of the lifting and lowering motion of the protective canopy. That angle is preferably a right angle or an angle in the range from 80° to 100°, so that a considerable modification of the operator's platform floor area covered by the protective canopy is already achievable with a small displacement path of the at least one canopy shell. Preferably the pull-out path extends, at least in the operating position of the protective canopy, parallel to the operator's platform floor surface.

In principle, the term "transport position" refers in the present Application only to a position of the protective canopy which permits compliance with predefined transport dimensions in terms of its decreased vertical distance from the operator's platform floor. Use of the term "transport position" implies nothing, however, regarding the relative position into which the protective canopy or parts thereof have been displaced along the pitch axis or along the roll axis with reference to the machine frame. Regardless of the relative position of the at least one canopy shell relative to the shell carrier, the protective canopy is therefore in the transport position when it is correspondingly lowered toward the operator's platform floor.

The operator's platform is preferably delimited along the pitch axis by side partitions. Along the roll axis, the operator's platform is usually adjacent to the machine frame on both sides. In order to make the operator's platform more difficult to access when the protective canopy is displaced into the transport position, the protective canopy can preferably assume, in the transport position, a protective position in which it rests with its side edge regions on edge regions of the side partitions, and/or engages behind them on its side facing away from the operator's platform. The protective canopy can also rest, in the protective position, with its front and rear edge regions on edge regions of the machine frame which delimit the operator's platform along the roll axis, and/or engage behind them on their side facing away from the operator's platform. This makes possible almost hermetic isolation of the operator's platform volume that has been decreased by the transport position of the protective canopy.

Specifically for transporting the machine and for associated compliance with predefined maximum transport dimensions, it can be advantageous if the protective canopy is conveyed into the transport position but the operator's platform is nevertheless at least locally accessible and usable so that from the operator's platform, the earth working machine that is almost ready for stowage can be moved onto a transport vehicle. In order to enable this, provision can be made that in the transport position, considering a projection respectively of the shell carrier and operator's platform floor along the yaw axis of the earth working machine onto a projection plane orthogonal to the yaw axis, the area occupied by the projected shell carrier in the projection plane is smaller than the area occupied by the operator's platform floor. As a result, the shell carrier cannot cover the entire area of the operator's platform floor. Provision is furthermore preferably made that the at least one canopy shell can assume, relative to the shell carrier, a maneuvering position in which a maneuvering region of the operator's platform floor is uncovered by the protective canopy. When the canopy shell is moved into the maneuvering position, the maneuvering region of the operator's platform can then be uncovered by the protective canopy even though the protective canopy is lowered into the transport position, so that in that region a machine operator can at least operate the motion drive system of the machine and observe the surroundings of the machine. Provision is therefore made that the operating device, or a part of the operating device which enables control at least of a travel mode of the machine, is located in that (maneuvering) region of the operator's platform which is not covered in the maneuvering position. Consideration can also be given to arranging the operating device or parts thereof movably in the operator's platform, so that the operating device or a part thereof can be conveyed if necessary into the aforementioned maneuvering region that is not covered.

Experience from machine operation hitherto has shown that for maneuvering the machine with the protective canopy lowered into the transport position and with the at least one canopy shell in the maneuvering position, a transverse end region of the operator's platform, i.e. a region located all the way out along the pitch axis, is advantageous as a maneuvering region. In order to enable a transverse end region of the operator's platform to remain uncovered by the protective canopy lowered into the transport position, the area occupied by the operator's platform floor can extend along the pitch axis of the earth working machine in at least one direction beyond the area occupied by the projected shell carrier. Considered in the Cartesian coordinate system made up of roll axis, yaw axis, and pitch axis, the pull-out path then preferably has a largest path component along the pitch axis, so that it can reliably be displaced along the pitch axis sufficiently that a non-covered maneuvering region can be constituted at one transverse end of the operator's platform and/or that an operator's platform that is enlarged, in particular widened, during operation in order to improve the machine operator's field of view can be covered with the protective canopy.

The shell carrier is preferably located at the transverse center of the machine along the pitch axis; particularly preferably, the transverse center of the shell carrier, to be measured along the pitch axis, is located at the transverse machine center that is to be measured in the same direction. It is often not possible to predict, before the machine is loaded onto a transport vehicle, where a maneuvering region is advantageously to be constituted based on the particular space circumstances existing at the loading location. A maneuvering region can be constituted at each of the two transverse ends of the operator's platform when the area occupied by the operator's platform extends on both sides along the pitch axis beyond the area occupied by the projected shell carrier, such that the pull-out path has, when considered in the Cartesian coordinate system made up of roll axis, yaw axis, and pitch axis, a largest path component along the pitch axis.

Maximum possible modification of the area coverable by the protective canopy, if desired beyond the operator's platform floor, and optimum adaptability of the location and size of the protective canopy to the respective operating instance, can be achieved by the fact that at least two canopy shells are provided on the shell carrier movably relative to the shell carrier independently of one another and/or together with one another. Because the protective canopy as a rule needs to be modified in terms of size and location most often along the pitch axis during operation of the earth working machine, so that the machine operator on the operator's platform can be optimally protected regardless of insolation and weather and so that obstacles present in the advance path of the earth working machine, such as traffic signals, road signs, trees, etc. can be avoided without needing to divert the machine from its intended advance path, the at least two canopy shells are each preferably movable along the pitch axis relative to the shell carrier. Their respective pull-out path preferably extends parallel to the pitch axis, as has already been stated above.

When the respective pull-out paths of the at least two canopy shells are not parallel to or coaxial with one another, the statements made in the present Application regarding a pull-out path with reference to an advantageous embodiment of the protective canopy, apply to the pull-out path of at least one canopy shell.

The protective canopy not only can serve to cover the operator's platform during operation and during phases of non-use, but can furthermore carry functional components of the earth working machine. In a concrete embodiment, provision can be made for this purpose that a functional component carrier can be arranged, on the shell carrier or on the lifting guidance part constituting a mounting component, movably relative to the mounting component between an operationally ready functional position and a transport-ready stowage position. A functional component carrier of this kind can carry at least one functional component that is embodied, for example, to determine the position of the machine or of the working apparatus, and/or to determine a relative arrangement of the machine or of the working apparatus, in particular a milling drum, relative to the surface that is to be worked. The functional component carrier can carry, for example, laser sensors for leveling and/or receivers for a global navigation satellite system (GNSS), for instance GPS, Glonass, or Galileo.

Thanks to the displaceability of the functional component carrier between the functional position and the stowage position, in the functional position a functional component carried by the functional component carrier can protrude prominently from the protective canopy and thus from the highest point of the machine, which is advantageous specifically in the preferred case of the aforementioned laser sensors so that they can easily be accessed by a laser source (or more generally a signal source) stationed outside the machine. In the stowage position the functional component can nevertheless not project beyond the silhouette of the machine body at least in a vertical machine direction.

The functional component carrier is preferably pivotable between the functional position and the stowage position, since a pivoting motion is easy to execute and can be performed with little space requirement. Because the machine as a rule has a substantially larger dimension parallel to the roll axis than parallel to the pitch axis, the pivot axis preferably extends parallel to the pitch axis. Upon pivoting of the functional component carrier a displacement thereof along the roll axis then occurs, and it is possible to ensure that, in its stowage position, the functional component carrier does not project beyond the remainder of the machine body and undesirably determine dimension.

In the stowage position, the functional component carrier is preferably protected by the protective canopy from undesired displacement into the functional position. Also preferably, in the functional position as well, the functional component carrier is protected by the protective canopy from undesired displacement into the stowage position. This can be achieved by the fact that the functional component carrier can be displaced from at least one of its positions into the respective other position only when the at least one canopy shell, preferably two canopy shells, is/are located in a predetermined pulled-out position along their respective pull-out path. In the preferred case of a functional component carrier pivotable between its positions, said carrier is therefore pivotable between the functional position and the stowage position around a pivot axis, preferably parallel to the pitch axis, parallel to which a largest of three mutually pairwise orthogonal extent components of the pull-out path extends. Once again, the pull-out path is to be considered here in a Cartesian coordinate system made up of the pitch axis, yaw axis, and roll axis. The pull-out path preferably extends parallel to the pitch axis.

In order to implement the above protective function of the functional component carrier preventing undesired displacement from the functional position into the stowage position, the at least one canopy shell therefore comprises a recess that does pass through the functional component carrier in the functional position but does not in the stowage position. If more than one canopy shell is present, the recess is preferably constituted by at least two canopy shells, particularly preferably by exactly two canopy shells, when the latter are in a predetermined position brought toward one another.

According to an advantageous refinement of the present invention, the operator's platform can be laterally enlarged so that several persons can comfortably occupy it and/or so that the machine operator can move over a wider region along the pitch axis and thereby has an enlarged field of view. Provision is made physically for that purpose that at least one side partition delimiting the operator's platform along the pitch axis of the earth working machine is translationally displaceable relative to the operator's platform floor at least, preferably only, along the pitch axis.

In order for the enlarged operator's platform also to be walkable in the enlarged region, at least one additional floor component, which is movable relative to a main operator's platform floor portion in order to enlarge the operator's platform floor area, can be arranged on the operator's platform floor. The width of the machine can then be kept small when an enlargement of the operator's platform is not necessary. The at least one additional floor component is preferably pivoted around a pivot axis. Because the enlargement of the operator's platform is intended to occur along the pitch axis, the pivot axis of the additional floor component preferably extends parallel to the roll axis. For easier operation, the motion of the additional floor component is coupled to the motion of the side partition located closest to it, so that simultaneously with the displacement of the side partition in order to enlarge the operator's platform, the additional floor component associated with the side partition becomes likewise displaced in such a way that it forms a walkable floor portion in the enlarged portion of the operator's platform. When the operator's platform is made smaller by displacing the side partition in an opposite direction, the additional floor component is moved back into a non-use position as a result of the preferred motion coupling to the side partition.

The aforementioned functional device that is controllable by the operating device on the operator's platform can be a motion drive and/or a steering apparatus of the machine and/or can be the earth-working apparatus, for example a milling drum.

The present Application furthermore relates to a method for modifying the vertical dimension of an earth working machine, in particular of an earth working machine as described above.

BRIEF DESCRIPTION OF THE DRAWINGS

The present invention will be explained in further detail below with reference to the appended drawings, in which.

DETAILED DESCRIPTION

Figure 1:
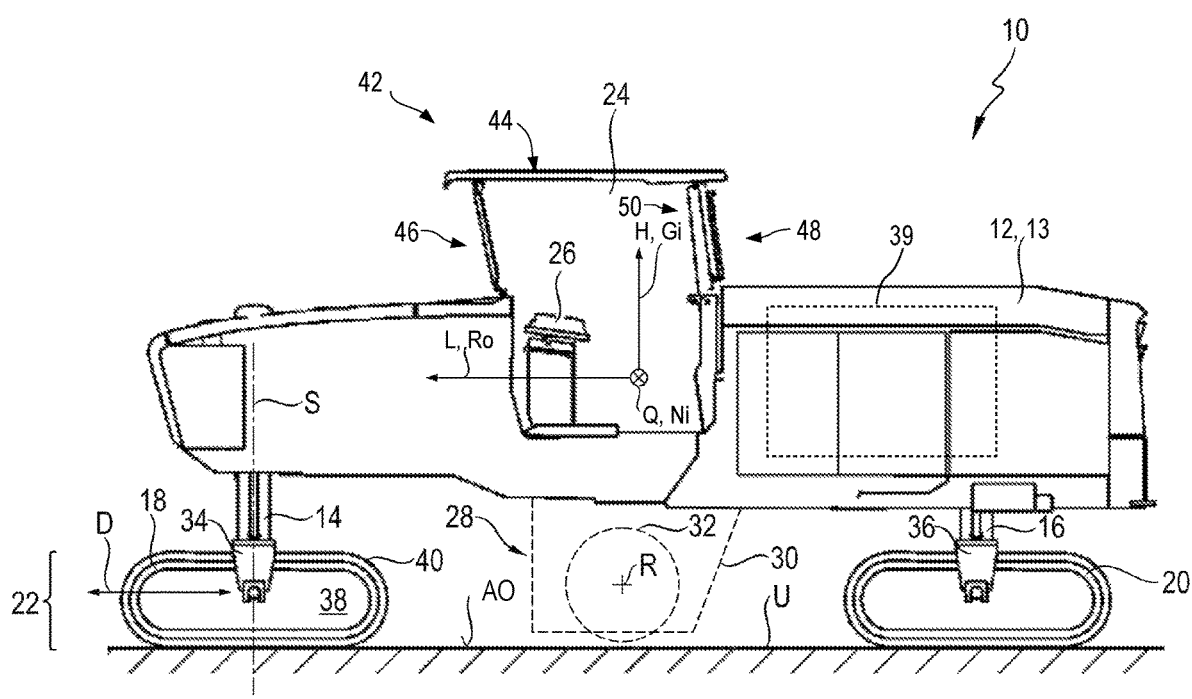
FIG. 1 is a schematic side view of an earth working machine in accordance with a use of the present invention.

In FIG. 1, an embodiment according to the present invention of an earth working machine in the form of a large earth milling machine or road milling machine is designated in general as 10. It encompasses a machine frame 12 that constitutes the basic framework for a machine body 13. Machine body 13 encompasses machine frame 12, and components of machine 10 which are connected to machine frame 12 and if applicable are movable relative thereto.

Machine body 13 encompasses front lifting columns 14 and rear lifting columns 16, which are connected at one end to machine frame 12 and at another end respectively to front drive units 18 and to rear drive units 20. The spacing of machine frame 12 from drive units 18 and 20 is modifiable using lifting columns 14 and 16.

Drive units 18 and 20 are depicted by way of example as crawler track units. Divergently therefrom, individual or all drive units 18 and/or 20 can also be wheel drive units.

The viewer of FIG. 1 is looking at the earth working machine, or simply "machine," 10 in transverse machine direction Q that is orthogonal to the drawing plane of FIG. 1. A longitudinal machine direction orthogonal to transverse machine direction Q is labeled L, and extends parallel to the drawing plane of FIG. 1. A vertical machine direction H likewise extends parallel to the drawing plane of FIG. 1 and orthogonally to longitudinal and transverse machine directions L and Q. The arrowhead of longitudinal machine direction L in FIG. 1 points in a forward direction. Vertical machine direction H extends parallel to yaw axis Gi of machine 10, longitudinal machine direction L extends parallel to roll axis Ro, and transverse machine direction Q extends parallel to pitch axis Ni.

Earth working machine 10 comprises an operator's platform 24 from which a machine operator can control machine 10 via a control panel 26.

Arranged below machine frame 12 is a working subassembly 28 that here constitutes, by way of example, a milling subassembly 28 having a milling drum 32, received in a milling drum housing 30, which is rotatable around a milling axis R extending in transverse machine direction Q so that substrate material can thereby be removed during earth working, proceeding from supporting surface AO of substrate U, to a milling depth determined by the relative vertical position of machine frame 12. Milling drum 32 is therefore a "working apparatus" as defined in the present Application. Alternatively or additionally, milling drum 32 can be received on machine frame 12 vertically adjustably relative thereto.

The vertical adjustability of machine frame 12 by way of lifting columns 14 and 16 also serves to set the milling depth, or generally working depth, of machine 10 upon earth working. Earth working machine 10 that is depicted by way of example is a large milling machine for which the arrangement of milling subassembly 28 between front and rear drive units 18 and 20 in a longitudinal machine direction L is typical. Large milling machines, or earth-removing machines in general, of this kind can comprise a transport belt for transporting removed earth material away from machine 10. A transport belt that is also present in principle on machine 10 is not depicted in FIG. 1 in the interest of better clarity.

It is not apparent from the side view of FIG. 1 that machine 10 respectively comprises, in both its front end region and its rear end region, two lifting columns 14 and 16 each having a drive unit 18, 20 connected thereto. Front lifting columns 14 are each coupled to drive units 18, in a manner furthermore known per se, by means of a drive unit connecting structure 34, for example a connecting fork that fits over drive unit 18 in transverse machine direction Q. Rear lifting columns 16 are connected to their respective drive unit 20 via a drive unit connecting structure 36 constructed identically to drive unit connecting structure 34. Drive units 18 and 20 are of substantially identical construction and constitute propelling unit 22 of the machine. Drive units 18 and 20 are motor-driven, as a rule by a hydraulic motor (not depicted).

The drive energy source of machine 10 is constituted by an internal combustion engine 39 which is received on machine frame 12 and by which, in the exemplifying embodiment, milling drum 32 is driven to rotate. The output of internal combustion engine 39 furthermore furnishes on machine 10 a hydraulic pressure reservoir with which hydraulic motors and hydraulic actuators on the machine are operable internal combustion engine 39 is thus also a source of the energy that advances machine 10.

In the example depicted, drive unit 18, having a running direction indicated by double arrow D, comprises a radially internal receiving and guidance structure 38 on which a recirculatable crawler track 40 is arranged and is guided to move peripherally.

Lifting column 14, and with it drive unit 18, is rotatable by means of a steering apparatus (not depicted in further detail) around a steering axis S. Preferably additionally but also alternatively, lifting column 16, and with it drive unit 20, can be rotatable by means of a steering apparatus around a steering axis parallel to steering axis S.

Operator's platform 24 is covered by a protective canopy structure 42 which encompasses a protective canopy 44 that is connected to machine frame 12 or machine body 13 via a front panel arrangement 46 and a rear partition arrangement 48. As will be explained in detail with reference to the Figures that follow, protective canopy 44 is arranged on machine frame 12 liftably and lowerably by means of a motion guidance system 50. Protective canopy 44 is shown in FIG. 1 in its lifted operating position in which machine 10 is ready for working operation.

Figure 2:
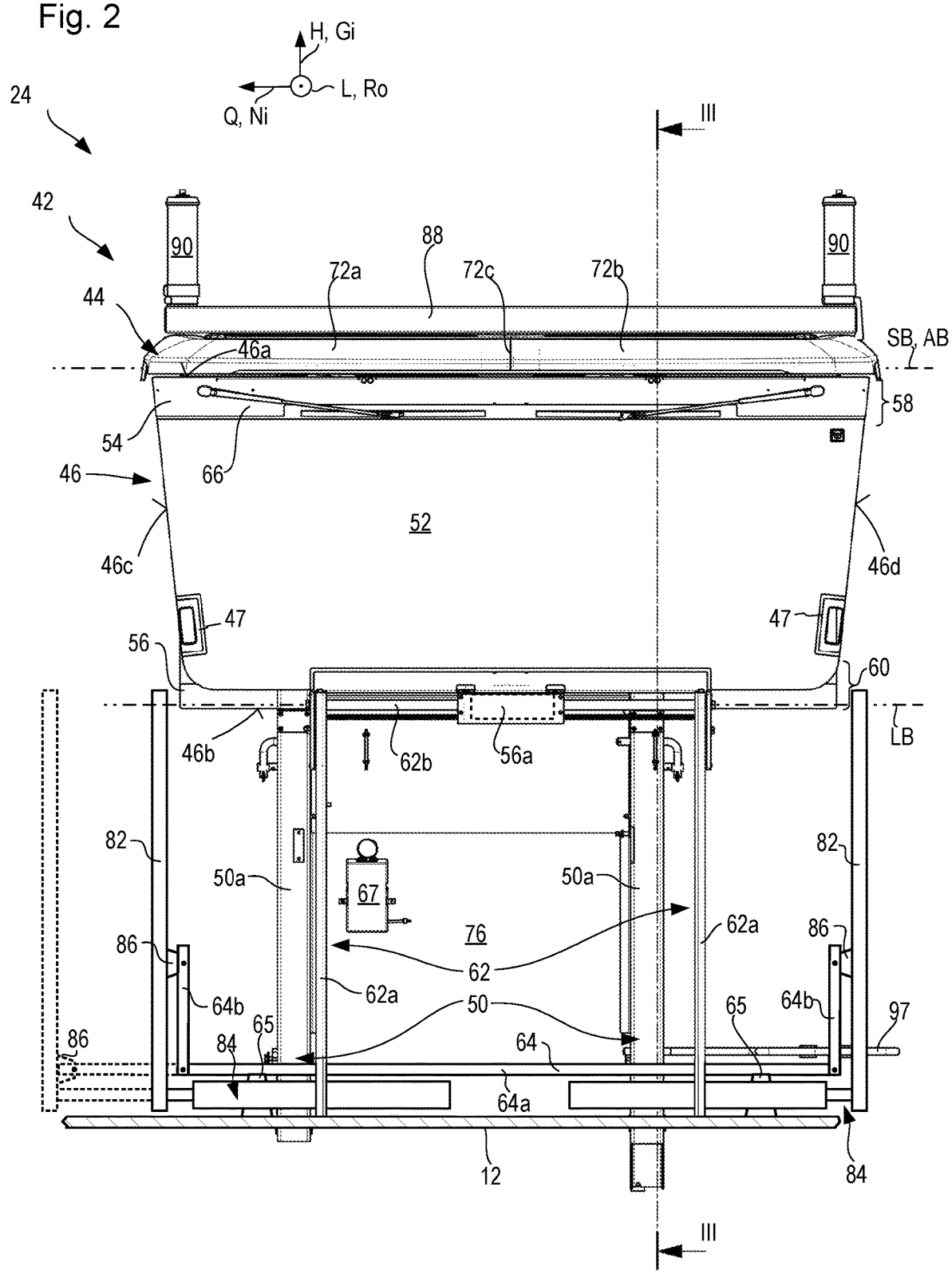
FIG. 2 is a schematic front view of the protective canopy structure of the earth working machine of FIG. 1.
Figure 3:
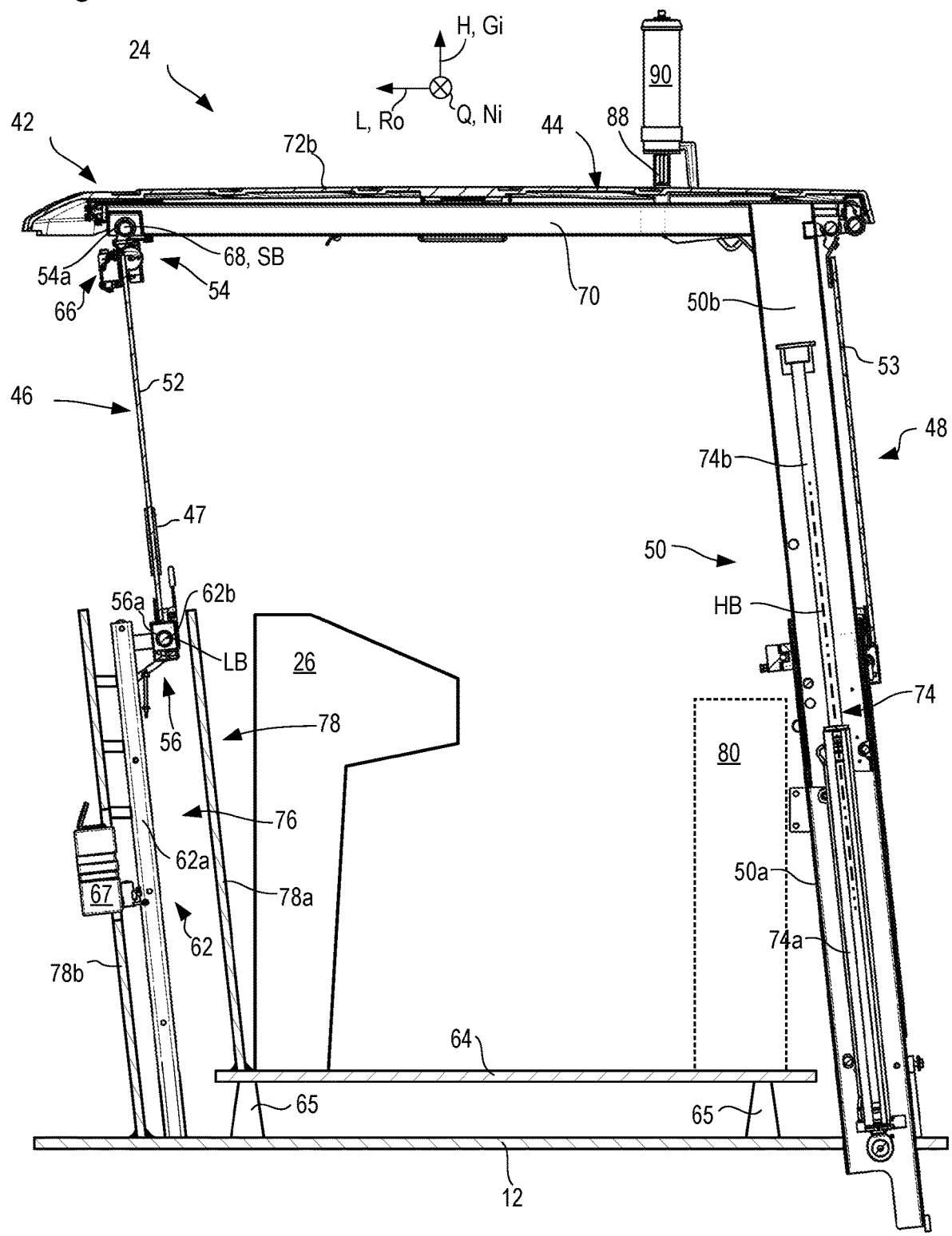
FIG. 3 is a schematic section view of the protective canopy structure of FIG. 2 from the side, looking at section plane III-Ill of FIG. 2.
Figure 4:
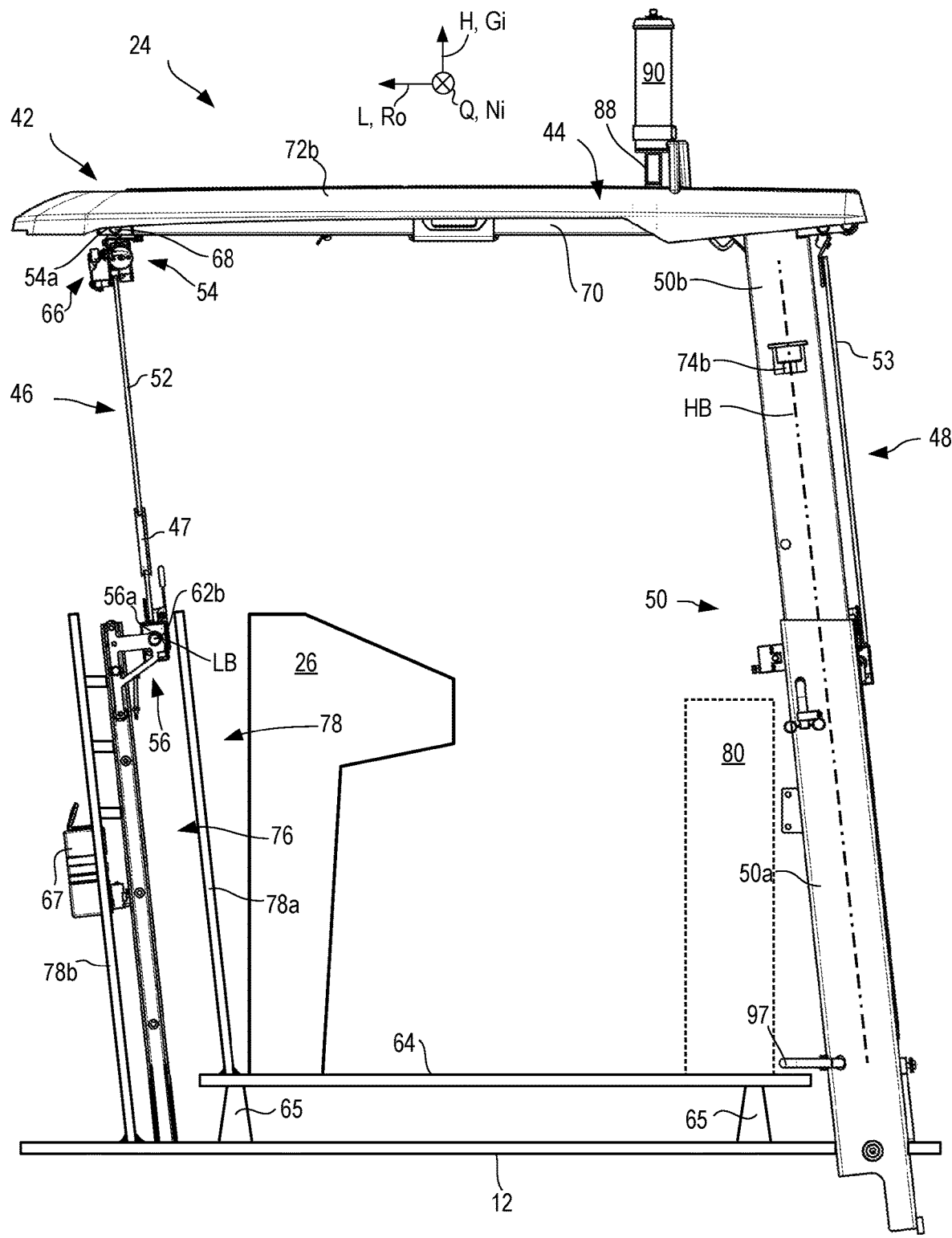
FIG. 4 is a schematic side view of the protective canopy structure of FIGS. 2 and 3 with the protective canopy in the operating position.

FIG. 2 schematically shows operator's platform 24 with its protective canopy structure 42, looking toward the rear of the machine from the front side of the machine along roll axis Ro. FIG. 3 is a lateral section view of operator's platform 24 with protective canopy structure 42, looking at section plane III-III of FIG. 2. FIG. 4 is a schematic unsectioned view of operator's platform 24 of FIG. 3 along pitch axis Ni. FIGS. 2, 3, and 4 will be considered together for the description below of operator's platform 24, and thus in particular of protective canopy structure 42.

Panel arrangement 46 extends in vertical direction H, i.e. parallel to yaw axis Gi, between an upper edge 46a and a lower edge 46b. The two edges 46a and 46b are connected by side edges 46c and 46d of panel arrangement 46 to yield a planar, in particular flat, panel arrangement 46. Side edges 46c and 46d are constituted by a transparent panel 52 that carries an upper connecting apparatus 54 and a lower connecting apparatus 56. Connecting apparatuses 54 and 56 are connected rigidly to panel 52 for motion together therewith, and are therefore part of panel arrangement 46.

Panel arrangement 46 is connected in an upper connecting region 58, by means of upper connecting apparatus 54, to protective canopy 44, and is connected in a lower connecting region 60, by means of lower connecting apparatus 56, to machine frame 12 via a linear guidance system 62.

Linear guidance system 62 encompasses two parallel guidance rails 62a, provided along pitch axis Ni at a distance from one another, in which lower connecting apparatus 56, and thus lower connecting region 60 of panel arrangement 46, are movably guided along guidance rails 62a. In the example depicted, guidance rails 62a are connected to machine frame 12 (see FIGS. 3 to 5).

More precisely, in the exemplifying embodiment depicted, a guidance rod 62b is guided shiftably on the parallel guidance rails 62a. A linear rolling element bearing 56a (depicted only with dashed lines in FIG. 2) is guided movably on guidance rod 62b, translationally along a lateral motion axis LB defined by the longitudinal axis of guidance rod 62b, and rotationally around that lateral motion axis LB. Linear rolling element bearing 56a is connected rigidly to lower connecting apparatus 56 and thus to panel 52.

Upper connecting apparatus 54 can carry further functional devices, for example windshield wipers 66. A spray water container 67 for a cleaning system (not depicted in further detail) for panel 52 is also depicted in FIG. 2.

As seen most easily in the section view of FIG. 3, upper connecting apparatus 54 is connected, analogously to lower connecting apparatus 56, to a shell carrier 70 of protective canopy 44 via a guidance rod 68 parallel to pitch axis Ni and via a linear rolling element bearing 54a connected fixedly to upper connecting apparatus 54. Guidance rod 68 is connected fixedly to shell carrier 70. Panel arrangement 46 is thus movable translationally along a side motion axis SB defined by the longitudinal axis of guidance rod 68, and rotationally around side motion axis SB. A torque around a flexural moment axis parallel to pitch axis Ni therefore cannot be transferred either between shell carrier 70 (and thus protective canopy 44) and panel arrangement 46, or between linear guidance system 62 (and thus a machine frame-mounted operator's platform floor 64) and panel arrangement 46. Transverse forces acting parallel to pitch axis Ni also cannot be transferred between shell carrier 70 and panel arrangement 46 or between panel arrangement 46 and linear guidance system 62. Side motion axis SB and lateral motion axis LB are parallel to one another and to pitch axis Ni.

In the exemplifying embodiment depicted, operator's platform floor 64 is connected to machine frame 12 via vibration dampers 65 so that the machine operator on machine platform 24 is not impacted by vibrations induced, inter alia, by milling. The relative micro-motion permitted by vibration decoupling is negligible in the context of the present Application. Operator's platform floor 64 is machine frame-mounted.

As a result of the above-described mounting via linear rolling element bearings 54a and 56a and associated guidance rods 62b and 68, panel arrangement 46 is shiftable parallel to pitch axis Ni both relative to protective canopy 44 and relative to operator's platform floor 64. Panel arrangement 46 comprises on both side edges 46c and 46d a respective grip configuration 47 to be grasped by the machine operator, so that the machine operator can convey panel arrangement 46 along pitch axis Ni, in the context of its range of motion, into a position that seems suitable to him or her. For example, panel arrangement 46 can thus be moved out of a collision region if there is a risk of collision with an object, for example a traffic signal, tree branch, or the like, as machine 10 continues to move forward during earth working operation.

Shell carrier 70 carries two canopy shells 72a and 72b. Canopy shells 72a and 72b are displaceable individually relative to shell carrier 70 along a pull-out path AB parallel to pitch axis Ni. Canopy shells 72a and 72b can also be displaced together relative to shell carrier 70 along pull-out path AB. No further relative movability exists between canopy shells 72a and 72b on the one hand and shell carrier 70 on the other hand.

Figure 5:
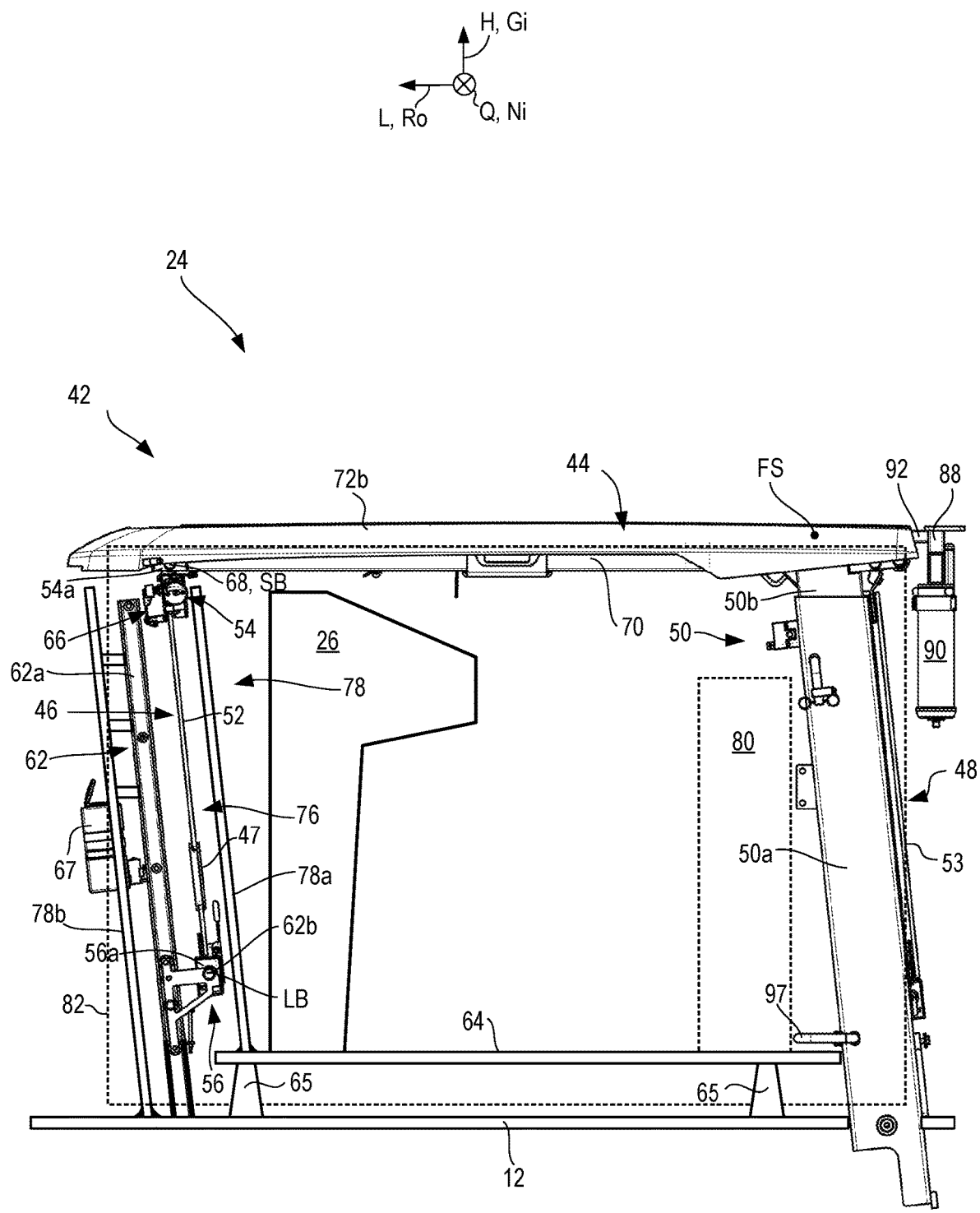
FIG. 5 is a schematic side view of the protective canopy structure of FIG. 4 with the protective canopy in the transport position.

Shell carrier 70 is liftable and lowerable by means of motion guidance system 50 along motion path HB (see FIG. 3) between the lifted operating position shown in FIGS. 1 to 4 and the lowered transport position shown in FIG. 5.

Motion guidance system 50, preferably constructed in telescoping fashion, will be explained in further detail with reference to the sectioned drawing of FIG. 3. Motion guidance system 50 encompasses a guidance tube 50a that is connected for movement together with machine frame 12 and is therefore machine frame-mounted, and a guidance tube 50b that is movable relative to the former tube along motion path HB that coincides with the longitudinal tube axis of guidance tube 50a. For more stable motion of protective canopy 44, guidance tubes 50a and 50b are provided in pairs, specifically offset from one another along pitch axis Ni. The two guidance tube pairs 50a, 50b are preferably constructed identically. The movable guidance tube 50b constitutes a lifting guidance part and the machine frame-mounted guidance tube 50a constitutes a counterpart lifting guidance part, as defined in the introductory part of the specification above.

A motion actuator, in the form of a piston-cylinder arrangement 74 whose cylinder 74a is articulated on the machine frame-mounted guidance tube 50a, is received in the machine frame-mounted guidance tube 50a. Piston rod 74b, which can be extended out of cylinder 74a and retracted thereinto, is articulated with its free longitudinal end on the movable guidance tube 50b. Actuation of piston-cylinder arrangement 74 can thus cause protective canopy 44 to be brought toward and away from operator's platform floor 64.

As a result of the above-described manner in which panel arrangement 46 is connected to protective canopy 44, in particular to shell carrier 70, panel arrangement 46 becomes displaced along motion path HB together with protective canopy 44 when protective canopy 44 is displaced between its operating position and its transport position. Because panel arrangement 46 is connected in its lower connecting region 60, via lower connecting apparatus 56 and linear guidance system 62, to operator's platform floor 64 in the manner described, lower edge 46b of panel arrangement 46 is brought toward or away from operator's platform floor 64, depending on the motion direction of protective canopy 44, upon a displacement of protective canopy 44 between its operating position and its transport position.

Panel arrangement 46 can thus be lowered into a receiving space 76 in which it is better protected from an external vandalism attack than was the case in the existing art. Receiving space 76 is covered by machine body 13 in a direction away from operator's platform 24, so that panel arrangement 46, lowered into receiving space 76, would be accessible only if, despite the lowering of protective canopy 44 into the transport position, a person gained access to operator's platform 24 that is then decreased in size.

So that an attack on panel arrangement 46 can even then be prevented, it is possible to provide a shield 78 which comprises a shielding plate 78a that is located substantially parallel to panel arrangement 46 and oppositely from operator's platform 24 when the protective canopy is in the transport position, and thus protects said arrangement from attack from operator's platform 24. Shield 78 can additionally comprise a further shielding plate 78b that is substantially parallel to shielding plate 78a and delimits receiving space 76 in a direction away from operator's platform 24, i.e. toward the front region of machine body 13. Shielding plate 78a preferably projects beyond panel arrangement 46, in the latter's lowered position of FIG. 5, along pitch axis Ni in both directions. Shielding plate 78a furthermore projects beyond panel arrangement 46, in the latter's lowered position, along yaw axis Gi at least toward protective canopy 44, preferably also in the opposite direction. The same is preferably also true of further shielding plate 78b. Shield 78 preferably surrounds receiving space 76 continuously around the motion path of panel arrangement 46, so that panel arrangement 46, lowered into receiving space 76, is shielded if possible on all sides. Shielding plate 78a can be connected, in particular welded, directly to operator's platform floor 64. Shielding plate 78b that provides shielding away from operator's platform 24 can be connected, in particular welded, directly to machine frame 12. In this instance, both shielding plates 78a and 78b are machine frame-mounted.

The statements made above with regard to panel arrangement 46 apply correspondingly to partition arrangement 48, with the stipulation that "partition 53" takes the place of "panel 52." Partition arrangement 48 as well, having a preferably transparent partition 53, is received on protective canopy construction 42 or on machine frame 12 displaceably via a linear guidance system, parallel to pitch axis Ni, relative to protective canopy 44 and likewise relative to operator's platform floor 64. A transfer of flexural moments around a flexural moment axis parallel to pitch axis Ni between protective canopy 44 and partition arrangement 48, and between partition arrangement 48 and operator's platform floor 64, is again prevented by a corresponding rotationally movable connection of partition arrangement 48 to protective canopy 44 and to the linear guidance system (not depicted in the Figures).

Lateral motion axis LB of panel arrangement 46, and a corresponding lateral motion axis at the lower end region of partition arrangement 48, preferably extend in parallel fashion. Panel 52 and partition 53 can thereby be aligned parallel to one another both in their lifted position when protective canopy 44 is in its operating position and in their lowered position when protective canopy 44 is in its transport position. In the exemplifying embodiment depicted, the parallel alignment of partition 53 and panel 52 exists not only in their respective end positions but also in any intermediate position.

An equipment cabinet 80, in which e.g. tools and/or special work clothing and/or food for the machine operator can be received, can be provided at that rear region of operator's platform 24 which is located closer to the rear of the machine. Equipment cabinet 80 can be of robust configuration and, given a sufficient width along pitch axis Ni, can serve as a shield toward operator's platform 24 for the lowered partition arrangement 48. The optionally present equipment cabinet 80 is shown only with dashed lines in FIGS. 2 to 5.

FIG. 2 schematically depicts, on both sides of operator's platform floor 64, a respective side partition 82 delimiting operator's platform 24 along pitch axis Ni. Side partitions 82 in FIG. 2 extend orthogonally to the drawing plane of FIG. 2 and thus substantially parallel to yaw axis Gi and parallel to roll axis Ro.

Both side partitions 82 are displaceable parallel to pitch axis Ni. Taking the example of the left side partition 82 in FIG. 2, it is illustrated by the retracted position shown with solid lines and the extended position shown with dashed lines. Operator's platform 24 can thus be widened, i.e. enlarged along pitch axis Ni, as necessary. Displacement actuators 84, in the preferred form of a piston-cylinder arrangement, are provided under operator's platform floor 64 for displacement of the side partitions. Alternatively to a pneumatic or hydraulic piston-cylinder arrangement, an electromechanical actuator 84 can also be provided. Actuators 84 are preferably displaceable mutually independently so that operator's platform 24 can also, selectably, be widened only on one side.

Operator's platform floor 64 encompasses a main operator's platform floor portion 64a that is connected in stationary fashion to the machine frame. In the region of side partitions 82, operator's platform floor 64 has additional floor components 64b, one at each transverse end region, which are movably connected, in the example depicted pivotably movably connected, to main operator's platform floor portion 64a. The pivot axis around which additional floor components 64b are connected to main operator's platform floor portion 64a extends parallel to roll axis Ro. This is merely a schematic depiction, however. The kinematics of additional floor components 64b can also be different, for example can encompass a combined rotational and shifting motion. Each additional floor component 64b is (preferably mechanically) coupled by a coupling part 86 for rotation together with side partition 82 that is closest to said component. Coupling part 86 ensures that an additional floor component 64b, upon displacement of its coupled side partition 82, becomes folded out into the extended position so that it lies in a common plane of extent with main operator's platform floor portion 64a and thus forms an operator's platform floor 64 having an enlarged area. Upon displacement of side partition 82 back into the retracted position, coupling part 86 ensures that the area of operator's platform floor 64 is made smaller again by displacement of the associated additional floor component 64b into the position shown with solid lines in FIG. 2. For the sake of clarity, displacement actuators 84 and additional floor components 64b are depicted only in FIG. 2.

In FIG. 5, side partition 82 is depicted in outline with dashed lines. FIG. 5 shows that when protective canopy 44 is lowered into its transport position, protective canopy 44, in particular canopy shells 72a and 72b, project beyond an upper edge of side partition 82 in a direction away from operator's platform 24. Side partition 82 is in this context in its retracted position. It is also evident from FIG. 2 that protective canopy 44 protrudes, along pitch axis Ni in a direction away from operator's platform 24, beyond the respective side partitions 82 in their retracted positions. The undercut in the transport position makes it difficult for a vandal to gain lever access in order to change the position of the lowered protective canopy 44.

FIGS. 2 to 7 show a functional component carrier 88 that, in its functional position as depicted in FIGS. 2 to 4, 6, and 7, is located above protective canopy 44. At its two end regions located along pitch axis Ni, functional component carrier 88 carries a respective functional component 90, in the example depicted a laser sensor 90.

Figure 6:
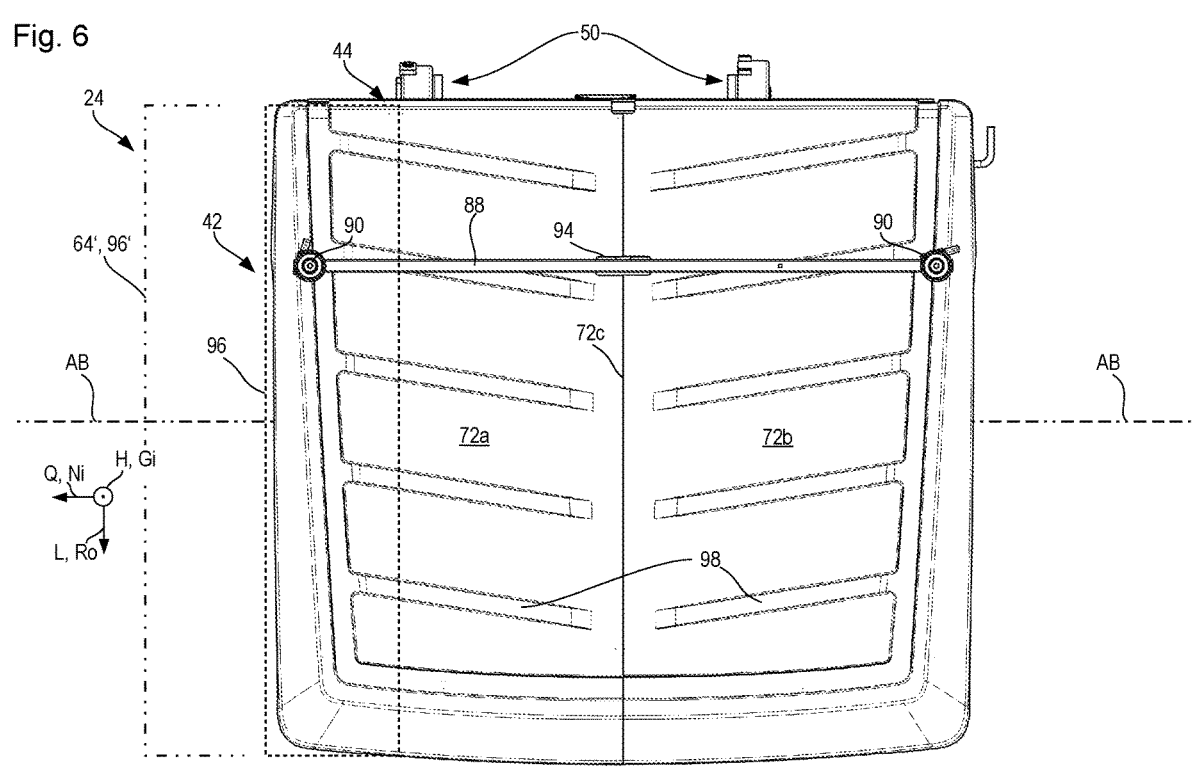
FIG. 6 is a schematic plan view of the protective canopy of the protective canopy structure of FIGS. 2 to 5, with two canopy shells brought maximally close to one another.
Figure 7:
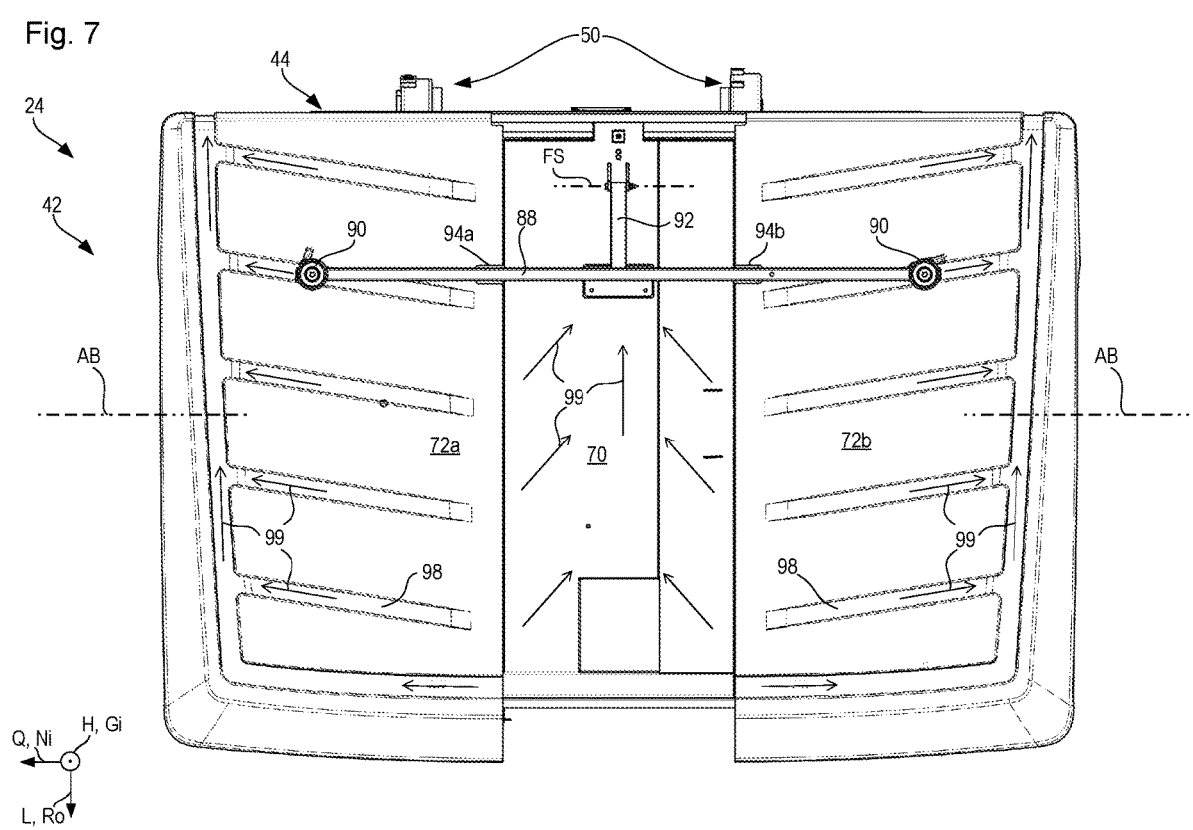
FIG. 7 is a schematic plan view of the protective canopy of FIG. 6, with two canopy shells moved away from one another and a shell carrier visible between them.

As seen most easily in FIG. 7, functional component carrier 88 is articulated on shell carrier 70 pivotably around a pivot axis FS via an arm 92 extending orthogonally to said carrier. By way of arm 92, functional component carrier 88 is displaceable 180° around pivot axis FS between its functional position depicted in FIGS. 2, 3, 4, 6, and 7 and its stowage position depicted in FIG. 5. The displacement can be accomplished manually.

A functional component 90 can thus project from protective canopy 44 along yaw axis Gi in a direction away from operator's platform 24 when functional component 90 is needed during operation of machine 10, and can be displaced beneath the upper delimiting surface of protective canopy 44 when it is not needed or when it gets in the way, for example during transport or in the event of an imminent collision with objects in the utilization sector of machine 10.

When functional component carrier 88 is in the functional position, functional component carrier 88 and/or arm 92 pass through an opening 94, embodied in substantially equal parts in each of canopy shells 72a and 72b, in protective canopy 44. When canopy shells 72a and 72b touch one along their separating join 72c, as shown in FIG. 6, functional component carrier 88 can then be mechanically blocked in simple fashion by canopy shells 72a and 72b to prevent undesired displacement from its functional position into the stowage position and vice versa. The respective opening halves 94a and 94b are evident in FIG. 7, where canopy shells 72a and 72b are displaced away from one another along pull-out path AB parallel to pitch axis Ni in order to increase the area covered by protective canopy 44.

In FIG. 7, canopy shells 72a and 72b are displaced in opposite directions away from one another. They can also, however, be displaced together in the same direction relative to shell carrier 70 in order to furnish a maneuvering region 96 (see FIG. 6) in which operator's platform floor 64 is uncovered by protective canopy 44 especially in the region of main operator's platform floor portion 64a, so that a machine operator can then be present in maneuvering region 96 on operator's platform 24 and can maneuver machine 10 when protective canopy 44 is lowered into its transport position. Because opening 94 is penetrated by functional component carrier 88 in the functional position, in the exemplifying embodiment depicted the formation of maneuvering region 96 is possible only when functional component carrier 88 has previously been conveyed into its stowage position. Functional component carrier 88 does not, however, need to be present.

As indicated in FIG. 6, divergently from what is stated above, the operator's platform floor, indicated as an operator's platform floor variant 64', can also project with a small coverage area along pitch axis Ni beyond protective canopy 44 in its configuration shown in FIG. 6. Even a small displacement of the two canopy shells 72a and 72b along their common pull-out path AB is then sufficient to create a sufficient maneuvering region 96'. If, as described above, operator's platform floor 64 does not project along pitch axis Ni beyond the protective canopy in its transport position, maneuvering region 96 can be furnished with a sufficient area by a correspondingly enlarged relative movability of canopy shell 72a and/or 72b relative to shell carrier 70. FIG. 6 reproduces the actual size relationships only qualitatively and schematically.

It should also be added that FIGS. 2, 4, and 5 show a bolt 97 that extends parallel to operator's platform floor 64 at a short distance therefrom. Protective canopy 44 can be locked in its transport position, and unlocked, by actuation of bolt 97. The machine operator can reach bolt 97 while standing on supporting surface AO, and does not need to climb onto operator's platform 24 in order to unlock protective canopy 44 and be able to shift it into the operating position.

A recessed trough configuration 98, which serves to discharge incident precipitation, is shaped respectively into canopy shells 72a, 72b. The outer canopy surface of a canopy shell 72a and 72b is tilted toward its respective trough configuration so that rainwater incident on canopy shells 72a, 72b flows toward trough configuration 98. Rainwater flows in trough configuration 98 in the direction of arrows 99 in FIG. 7 as a result of the corresponding tilt of the trough bottom. In the interest of clarity, not all arrows 99 are labeled with reference characters.

A portion of shell carrier 70 which is exposed toward the top when canopy shells 72a, 72b are pulled apart is, when viewed from above, embodied concavely along pitch axis Ni and is tilted along roll axis Ro at least in its transverse center region. Precipitation incident on shell carrier 70 flows toward the transverse center because of the concavity. Because of the tilt of the transverse center region, precipitation flows off shell carrier 70 along roll axis Ro, preferably toward the rear longitudinal end of machine 10. On shell carrier 70 as well, arrows 99 indicate approximately the flow direction of incident precipitation.

The invention claimed is:

1. An earth working machine, comprising:
    a propelling unit;
    a machine frame carried by the propelling unit;
    a working apparatus supported from the machine frame for earth working;
    an operator's platform provided on the machine frame, the operator's platform including an operator's platform floor and a control panel, at least one of the machine frame and the operator's platform floor defining a connecting base;
    a protective canopy liftable and lowerable relative to the operator's platform floor between a lifted operating position and a lowered transport position;
    a panel arrangement including a panel, the panel arrangement including an upper edge, a lower edge, and two side edges spanning between the upper edge and the lower edge, the upper edge being located closer to the protective canopy than is the lower edge;

the panel arrangement including an upper connecting region connected to the protective canopy, the upper connecting region being located closer to the upper edge than to the lower edge;

the panel arrangement including a lower connecting region connected to the connecting base, the lower connecting region being located closer to the lower edge than to the upper edge;

wherein the panel arrangement is liftable together with the protective canopy such that the lower edge is movable away from the operator's platform floor, and the panel arrangement is lowerable together with the protective canopy such that the lower edge is movable toward the operator's platform floor; and a shield defining a receiving space into which the panel arrangement is lowered as the protective canopy is lowered into the lowered transport position, the receiving space being shielded at least on a side of the panel arrangement opposite from the operator's platform.

2. The earth working machine of claim 1, further comprising:

a linear guidance system connecting the lower connecting region of the panel arrangement to the connecting base, the linear guidance system being configured to guide a relative motion of the lower connecting region away from and toward the connecting base as the protective canopy is lifted and lowered, respectively.

3. The earth working machine of claim 2, wherein:

the upper connecting region of the panel arrangement is rotatably connected to the protective canopy around a side motion axis orthogonal to a motion path of a lifting and lowering motion of the protective canopy.

4. The earth working machine of claim 3, wherein:

the lower connecting region of the panel arrangement is rotatably connected relative to the connecting base around a lateral motion axis parallel to the side motion axis.

5. The earth working machine of claim 2, wherein:

the upper connecting region of the panel arrangement is connected to the protective canopy translationally shiftably along a side motion axis relative to the protective canopy; and the lower connecting region of the panel arrangement is connected relative to the connecting base translationally shiftably along a lateral motion axis, the lateral motion axis being parallel to the side motion axis.

6. The earth working machine of claim 1, further comprising:

the protective canopy including a shell carrier and at least one canopy shell received on the shell carrier, the at least one canopy shell being movable relative to the shell carrier; and a motion guidance system configured to guide a lifting and lowering motion of the protective canopy between the lifted operating position and the lowered transport position, the motion guidance system including a lifting guidance part and a lifting guidance counterpart, the lifting guidance part being connected to the shell carrier for lifting and lowering motion together with the shell carrier, and the lifting guidance counterpart being connected to the connecting base.

7. The earth working machine of claim 6, wherein:

the at least one canopy shell is movable relative to the shell carrier translationally along a pull-out path at an angle to a motion path of the of the lifting and lowering motion.

8. The earth working machine of claim 7, wherein:

the operator's platform floor occupies an area extending along a pitch axis of the earth working machine beyond an area occupied by the shell carrier, the pull-out path having a largest path component extending along the pitch axis.

9. The earth working machine of claim 8, wherein:

the pull-out path extends parallel to the pitch axis.

10. The earth working machine of claim 7, wherein:

the angle is a right angle.

11. The earth working machine of claim 6, wherein:

the at least one canopy shell comprises at least two canopy shells movable relative to the shell carrier independently of one another.

12. The earth working machine of claim 6, wherein:

the at least one canopy shell comprises at least two canopy shells movable relative to the shell carrier together with one another.

13. The earth working machine of claim 6, further comprising:

a functional component carrier pivotally mounted on either the shell carrier or on the lifting guidance part, and pivotal between an operationally ready functional position and a transport-ready stowage position.

14. The earth working machine of claim 1, further comprising:

at least one side partition delimiting the operator's platform along a pitch axis of the earth working machine, the at least one side partition being translationally displaceable relative to the operator's platform floor along the pitch axis so that the operator's platform is enlargeable along the pitch axis.

15. The earth working machine of claim 14, further comprising:

at least one additional floor component movable relative to the operator's platform floor in order to enlarge a floor area of the operator's platform floor.

16. The earth working machine of claim 1, wherein:

the shield includes first and second spaced shielding plates defining the receiving space between the shielding plates.

17. The earth working machine of claim 1, wherein:

the receiving space extends transversely relative to the machine frame and parallel to a pitch axis of the machine frame.

18. An earth working machine, comprising:

a propelling unit;

a machine frame carried by the propelling unit;

a working apparatus supported from the machine frame for earth working;

an operator's platform provided on the machine frame, the operator's platform including an operator's platform floor and a control panel, at least one of the machine frame and the operator's platform floor defining a connecting base;

a protective canopy liftable and lowerable relative to the operator's platform floor between a lifted operating position and a lowered transport position;

a panel arrangement including a panel, the panel arrangement including an upper edge, a lower edge, and two side edges spanning between the upper edge and the lower edge, the upper edge being located closer to the protective canopy than is the lower edge;

the panel arrangement including an upper connecting region connected to the protective canopy, the upper connecting region being located closer to the upper edge than to the lower edge;

the panel arrangement including a lower connecting region connected to the connecting base, the lower connecting region being located closer to the lower edge than to the upper edge;

wherein the panel arrangement is liftable together with the protective canopy such that the lower edge is movable away from the operator's platform floor, and the panel arrangement is lowerable together with the protective canopy such that the lower edge is movable toward the operator's platform floor;

a partition arrangement including a planar partition, the partition arrangement including an upper edge, a lower edge and two side edges spanning between the upper edge and the lower edge, the upper edge of the partition arrangement being located closer to the protective canopy than is the lower edge of the partition arrangement;

the partition arrangement including an upper connecting region connected to the protective canopy, the upper connecting region being located closer to the upper edge of the partition arrangement than to the lower edge of the partition arrangement;

the partition arrangement including a lower connecting region connected to the connecting base, the lower connecting region being located closer to the lower edge of the partition arrangement than to the upper edge of the partition arrangement; and wherein the partition arrangement is liftable together with the protective canopy such that the lower edge of the partition arrangement is movable away from the operator's platform floor, and the partition arrangement is lowerable together with the protective canopy such that the lower edge of the partition arrangement is movable toward the operator's platform floor.

19. The earth working machine of claim 18, wherein:

the upper edge of the panel arrangement and the upper edge of the partition arrangement extend parallel to one another.

20. An earth working machine, comprising:

a propelling unit;

a machine frame carried by the propelling unit;

a working apparatus supported from the machine frame for earth working;

an operator's platform provided on the machine frame, the operator's platform including an operator's platform floor and a control panel, at least one of the machine frame and the operator's platform floor defining a connecting base;

a protective canopy liftable and lowerable relative to the operator's platform floor between a lifted operating position and a lowered transport position;

a panel arrangement including a panel, the panel arrangement including an upper edge, a lower edge, and two side edges spanning between the upper edge and the lower edge, the upper edge being located closer to the protective canopy than is the lower edge;

the panel arrangement including an upper connecting region connected to the protective canopy, the upper connecting region being located closer to the upper edge than to the lower edge;

the panel arrangement including a lower connecting region connected to the connecting base, the lower connecting region being located closer to the lower edge than to the upper edge;

wherein the panel arrangement is liftable together with the protective canopy such that the lower edge is movable away from the operator's platform floor, and the panel arrangement is lowerable together with the protective canopy such that the lower edge is movable toward the operator's platform floor;

the protective canopy including a shell carrier and at least one canopy shell received on the shell carrier, the at least one canopy shell being movable relative to the shell carrier; and a motion guidance system configured to guide a lifting and lowering motion of the protective canopy between the lifted operating position and the lowered transport position, the motion guidance system including a lifting guidance part and a lifting guidance counterpart, the lifting guidance part being connected to the shell carrier for lifting and lowering motion together with the shell carrier, and the lifting guidance counterpart being connected to the connecting base;

a functional component carrier pivotally mounted on either the shell carrier or on the lifting guidance part, and pivotal between an operationally ready functional position and a transport-ready stowage position;

wherein the at least one canopy shell is movable relative to the shell carrier translationally along a pull-out path at a right angle to a motion path of the of the lifting and lowering motion; and wherein the functional component carrier is pivotable between the functional position and the stowage position around a pivot axis parallel to which a largest of three mutually pairwise orthogonal extent components of the pull-out path extends.

21. The earth working machine of claim 20, wherein:

the pull-out path is parallel to the pivot axis.

* * * * *